United States Patent
Dobson et al.

(10) Patent No.: US 12,020,072 B2
(45) Date of Patent: Jun. 25, 2024

(54) COMPUTING RESOURCE ALLOCATION

(71) Applicant: Hadean Supercomputing Ltd, London (GB)

(72) Inventors: Matthew Carlson Dobson, London (GB); James Peter Nicholas Kay, London (GB); Rashid Mohamed Mansoor, London (GB)

(73) Assignee: HADEAN SUPERCOMPUTING LTD, London (GB)

( * ) Notice: Subject to any disclaimer, the term of this patent is extended or adjusted under 35 U.S.C. 154(b) by 290 days.

(21) Appl. No.: 17/311,289

(22) PCT Filed: Dec. 9, 2019

(86) PCT No.: PCT/EP2019/084254
§ 371 (c)(1),
(2) Date: Jun. 4, 2021

(87) PCT Pub. No.: WO2020/115330
PCT Pub. Date: Jun. 11, 2020

(65) Prior Publication Data
US 2022/0019475 A1 Jan. 20, 2022

(30) Foreign Application Priority Data

Dec. 7, 2018 (GB) .................................... 1820024
Jul. 29, 2019 (EP) .................................... 19188929

(51) Int. Cl.
*G06F 9/50* (2006.01)

(52) U.S. Cl.
CPC .......... *G06F 9/5038* (2013.01); *G06F 9/5044* (2013.01); *G06F 9/5083* (2013.01); *G06F 2209/504* (2013.01); *G06F 2209/508* (2013.01)

(58) Field of Classification Search
CPC .... G06F 9/5038; G06F 9/5044; G06F 9/5083; G06F 2209/504; G06F 2209/508; G06F 9/4843; Y02D 10/00
See application file for complete search history.

(56) References Cited

U.S. PATENT DOCUMENTS 9,081,627 B1 * 7/2015 Blanding .............. G06F 9/5061
2008/0172674 A1 * 7/2008 Yee ....................... G06F 16/254
718/106

(Continued)

FOREIGN PATENT DOCUMENTS

WO 2020115330 A1 6/2020

OTHER PUBLICATIONS

International Search Report and Written Opinion for International Application No. PCT/EP2019/084254, entitled "Computing Resource Allocation." Date Mailed: Mar. 10, 2020.

(Continued)

*Primary Examiner* — Sisley N Kim
(74) *Attorney, Agent, or Firm* — Hamilton, Brook, Smith & Reynolds, P.C.

(57) ABSTRACT

There is provided a method of computing resource allocation. The method comprises allocating a first bounded amount of computing resources forming a first set of computing resources; exclusively assigning the first set of computing resources to a first process of a computer program; receiving a request from the first process for additional computing resources; in response to the request from the first process, allocating a second bounded amount of computing resources forming a second set of computing resources; and spawning a second process from the first process and exclusively assigning the second set of computing resources to the second process; wherein this method may be repeated indefinitely by the first process, second process, or any other process created according to this (Continued)

method. By following this method, a process does not control the amount of computing resources allocated to that process (i.e., itself), but instead controls the amount of computing resources allocated to its child processes.

19 Claims, 7 Drawing Sheets

(56) References Cited

U.S. PATENT DOCUMENTS

2019/0245756 A1* 8/2019 Onoue ............... H04L 43/091
2020/0050487 A1* 2/2020 Garla ................. G06F 9/5061

OTHER PUBLICATIONS

Lagar-Cavilla, H. A.. et al., "SnowFlock: Rapid Virtual Machine Cloning for Cloud Computing," ACM, pp. 1-12 (2009).
Canadian Intellectual Property Office Examination Report dated Oct. 6, 2022 for Application No. 3,122,173, entitled "Computing Resource Allocation".
International Written Opinion mailed Jun. 10, 2020 for International Application No. PCT/EP2019/084254, entitled "Computing Resource Allocation".
International Preliminary Report on Patentability issued Mar. 22, 2021 for International Application No. PCT/EP2019/084254, entitled "Computing Resource Allocation".
Boner, J. D "Akka (toolkit)" downloaded from internet on Jan. 25, 2023: https://en.wikipedia.org/w/index.php?title=Akka_(toolkit)&oldid=1118358769, 5 pages.
Cutting, D., et al., "Apache Hadoop" downloaded from internet on Jan. 25, 2023: https://en.wikipedia.org/wiki/Apache_Hadoop, 13 pages.
Zaharia, M., "Apache Spark" downloaded from internet on Jan. 25, 2023: https://en.wikipedia.org/wiki/Apache_Spark, 5 pages.
Hlykes, S., "Docker (software)" downloaded from internet on Jan. 25, 2023: ttps://en.wikipedia.org/wiki/Docker_(software), 8 pages.
"Kubernetes" downloaded from internet on Jan. 25, 2023: https://en.wikipedia.org/wiki/Kubernetes, 17 pages.
"TidalScale Announces Breakthrough Flexibility and Performance for In-Memory Applications with Thrid Generation Software-Defined Server Technology," downloaded from internet on Jan. 25, 2023; https://www.tidalscale.com/news/tidalscale-announces-breakthrough/, Announcement date: Sep. 12, 2019; 5 pages.

\* cited by examiner

COMPUTING RESOURCE ALLOCATION

This application is the U.S. National Stage of International Application No. PCT/EP2019/084254, filed Dec. 9, 2019, which designates the U.S., published in English, and claims priority under 35 U.S.C. § 119 or 365(c) to European Application No. 19188929.4, filed Jul. 29, 2019 and Great Britain Application No. 1820024.6, filed Dec. 7, 2018. The entire teachings of the above applications are incorporated herein by reference.

The present disclosure relates to computing systems and methods of allocating resources to processes at computing systems.

BACKGROUND

Distributed computing systems can be used to tackle large and/or complex computational problems by distributing the computing workload over a group of networked processing devices. Such systems are also increasingly used to provide cloud services. Distributed computing systems are interesting because they allow for building solutions to larger-scale problems (e.g., bigger, more complex) than would be possible on a single computing device. However, distributed computing systems are often significantly more complicated to build and maintain than single-device solutions.

There have been numerous previous approaches to distributed computing. Recent approaches to distributed computing include systems such as Docker, Kubernetes, Spark, Akka, and TidalScale. Each of these approaches provides a way to manage the set of networked computing devices utilised by an individual application. One commonality across all these previous distributed computing systems is that they present a process model that is Turing-complete. That is, fundamentally programs are designed with the assumption that each process has access to an infinite amount of memory to complete its individual computing task. Such systems provide facilities for a running process to request additional resources on-demand, and hence the set of resources utilised by a process changes over time. In such systems, processes are constructed so that they request additional resources (or free no longer needed resources) as their computational tasks or demands change. On the surface, this appears to make application development simpler, as a developer need not plan out their program's resource usage up front, but can instruct the program's various processes to simply request more if they find their current allocation is insufficient. However, as many processes typically run on a given node, the sum total of resources requested by user processes may eventually exceed the resources on that node. When this happens, programs can find themselves unable to make progress or even crash.

Docker runs software packages called containers. Containers are isolated from one another, and include their own tools, libraries, and configuration files. Isolation is performed on the kernel level without the need for a guest operating system—as is the case with the provisioning of virtual machines. Scheduling and clustering functionalities, such as Docker Swarm, facilitate the use of Docker containers for distributed computing. By default, a container has no resource constraints and can use as much of a given resource, such as memory, as the host's kernel allows. Docker supports memory allocation functions, such as malloc( ), in which a process being executed can obtain additional resources on demand. However, when a process begins to overuse resources, the host kernel starts terminating processes to free up memory. Docker is thus susceptible to system crashes. Any process is subject to termination—including key or underpinning processes, the termination of which can lead to system crashes. Regardless, the termination of an application process is likely to result in the crash of the particular application to which the process belongs (whether distributed or otherwise) running across one or more Docker instances.

Kubernetes is an example of a container-orchestration system for automating the deployment, scaling and management of containerised applications, such as Docker. Kubernetes works by provisioning pods containing a number of containers. The containers in a pod are guaranteed to be on the same host server and are allowed to share resources, such as memory. The setting of memory constraints for each pod is optional. It is possible to provision multiple Pods on one server. Thus, Kubernetes suffers from the same drawbacks as the containerised application, such as Docker, that underpins it. In addition, the sharing of memory between the containers of a pod has drawbacks. For example, a resource-hungry container can lead to other containers in the pod being starved of resources.

Middleware approaches, such as Hadoop, Spark and Akka, provide high-level application programming interfaces (APIs) for distributed computing. These systems enable a user to provision a cluster of computers and distribute a computational problem across that cluster via some programming model. Hadoop provides a map/reduce abstraction across data stored on the Hadoop Distributed File System (HDFS) filesystem. Spark provides improvements upon the Hadoop model via improved data structures such as the Resilient Distributed Dataset (RDD) and Dataframe with additional operations beyond map and reduce such as group by, set difference, and various join operations. Akka implements an actor model with location transparency such that an actor can send messages to another actor by directly addressing the actor. The actors may sit distributed across different servers in the Akka cluster. Hadoop, Spark and Akka run on top of conventional systems that enable the sharing of memory and the use of memory allocation functions such as malloc( )—and thus suffer from the same problems as those underlying systems.

TidalScale provides an abstraction in which software-defined servers pool resources provided by a number of hardware servers and present a user with a single virtual machine. As such, TidalScale and similar approaches use a reverse-virtualisation approach where many servers appear as one large server. Resources provided by the hardware servers, such as memory, are shared between the processes being executed on the system and often dynamically allocated. This is problematic because memory may not always be available to a process when it expects it to be—leading to process termination. Furthermore, applications scale poorly because TidalScale uses a distributed shared-memory model in which programs scale via a multi-threading approach that uses locks. Lock contention escalates over time and with scale resulting in dramatic performance bottlenecks and reliability issues that are difficult to debug.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

There is provided a method of computing resource allocation. The method comprises allocating a first bounded amount of computing resources forming a first set of computing resources; exclusively assigning the first set of computing resources to a first process of a computer program; receiving a request from the first process for additional computing resources; in response to the request from the first process, allocating a second bounded amount of computing resources forming a second set of computing resources; and spawning a second process from the first process and exclusively assigning the second set of computing resources to the second process.

This method may be indefinitely repeated by the first process, the second process, and/or any other process created according to this method. In this way, any arbitrary tree of processes may be formed.

By following this method, a process does not control the amount of computing resources allocated to that process (i.e., itself), but instead controls the amount of computing resources allocated to its child processes.

In some examples, the first and second set of computing resources are provided by a first node of a computing system.

In some examples, the first and second set of computing resources are respectively provided by a first and a second node of a computing system.

In some examples, the first set of computing resources is backed by physical resources of the first bounded amount to guarantee the first bounded amount of computing resources to the first process. In some examples, the second set of computing resources is backed by physical resources of the second bounded amount to guarantee the second bounded amount of computing resources to the second process.

In some examples, the second set of computing resources is isolated from the first process.

In some examples, the request for additional computing resources from the first process comprises an indication of the second bounded amount of computing resources.

In some examples, the method further comprises providing the first process with a reference to the second process.

In some examples, the method further comprises allocating a channel for communication between the first and second processes.

In some examples, the first and second bounded amounts are the same.

In some examples, allocating the second bounded amount of computing resources comprises initiating provisioning of a node to provide the second set of computing resources.

There is provided a method of obtaining computing resources comprising: determining, by a first process of a computer program, an amount of computing resources to request; and responsive to the determining, requesting to spawn a second process from the first process, the request comprising the amount of computing resources to be assigned to the second process.

In some examples, the method further comprises receiving, by the first process, a reference to the second process.

In some examples, the method further comprises communicating with the second process, by the first process, via a channel from the first to the second process created using the reference to the second process.

In some examples, the method further comprises: determining, by the first process, a third amount of computing resources to request; responsive to the determining, requesting to spawn a third process from the first process, the request comprising the amount of computing resources to be assigned to the third process; receiving, by the first process, a reference to the third process; sending, by the first process to the second process, the reference to the third process via the channel from the first to the second process; and communicating with the third process, by the second process, via a channel from the second to the third process created using the reference to the third process sent by the first process.

In some examples, the channel is an inter-process communication, IPC, channel. In some examples, the channel is a network channel.

In some examples, the request from the first process indicates that the computing resources should be provided by a first node, the first node providing processing resources used to execute the first process.

In some examples, responsive to the request from the first process indicating that the computing resources should be provided by the first node, the second set of computing resources is allocated from the first node.

In some examples, the computing resources comprise memory resources. In some examples, the computing resources comprise processing resources. In some examples, the computing resources comprise communication resources. In some examples, the computing resources comprise storage resources.

There is provided a computer program comprising instructions which, when executed by one or more computers, cause the one or more computers to perform any of the operations described herein. There is also provided a computer-readable medium comprising the computer program. There is also provided a data carrier signal carrying the computer program.

There is provided a computer system configured to perform any of the operations described herein. In some examples, the computer system comprises the computer-readable medium and one or more processors configured to execute the computer program stored thereon. In some examples, the computer system comprises circuitry configured to perform any of the operations described herein.

There is provided a computing system for executing a program comprising a plurality of processes, the system comprising a plurality of interconnected nodes each contributing to a pool of discrete resources that includes discrete processing resources and discrete memory resources, and the system being configured to allocate from the pool to each process of the program: a discrete processing resource; a discrete memory resource of predetermined finite size; and, optionally, any other discrete resources (e.g., disk, network bandwidth, GPU) requested; wherein the discrete processing resource, the discrete memory resource, and the other discrete resources are at the same node and the system is operable to allocate resources at different nodes to different processes of the program.

There is provided a method of allocating resources to a program executing on a computing system, the system comprising a plurality of interconnected nodes each contributing to a pool of discrete resources that includes discrete processing resources and discrete memory resources, and the program comprising a plurality of processes, the method comprising: allocating from the pool of discrete resources to a first process of the program, a first discrete processing resource and a first discrete memory resource of a first predetermined finite size; allocating from the pool of discrete resources to a second process of the program, a second discrete processing resource and a second discrete memory resource of a second predetermined finite size; optionally, sending to the first process a reference to the second process, the reference being used to enable communication between the first and second processes; wherein the first discrete processing resource and the first discrete memory resource are at a first node and the second discrete processing resource and the second discrete memory resource are at a second node of the plurality of interconnected nodes. This method may be repeated by any process of the original program and process references may be sent by any of the processes via communication channels, thus enabling the creation of arbitrary process communication topologies.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Figure 1:
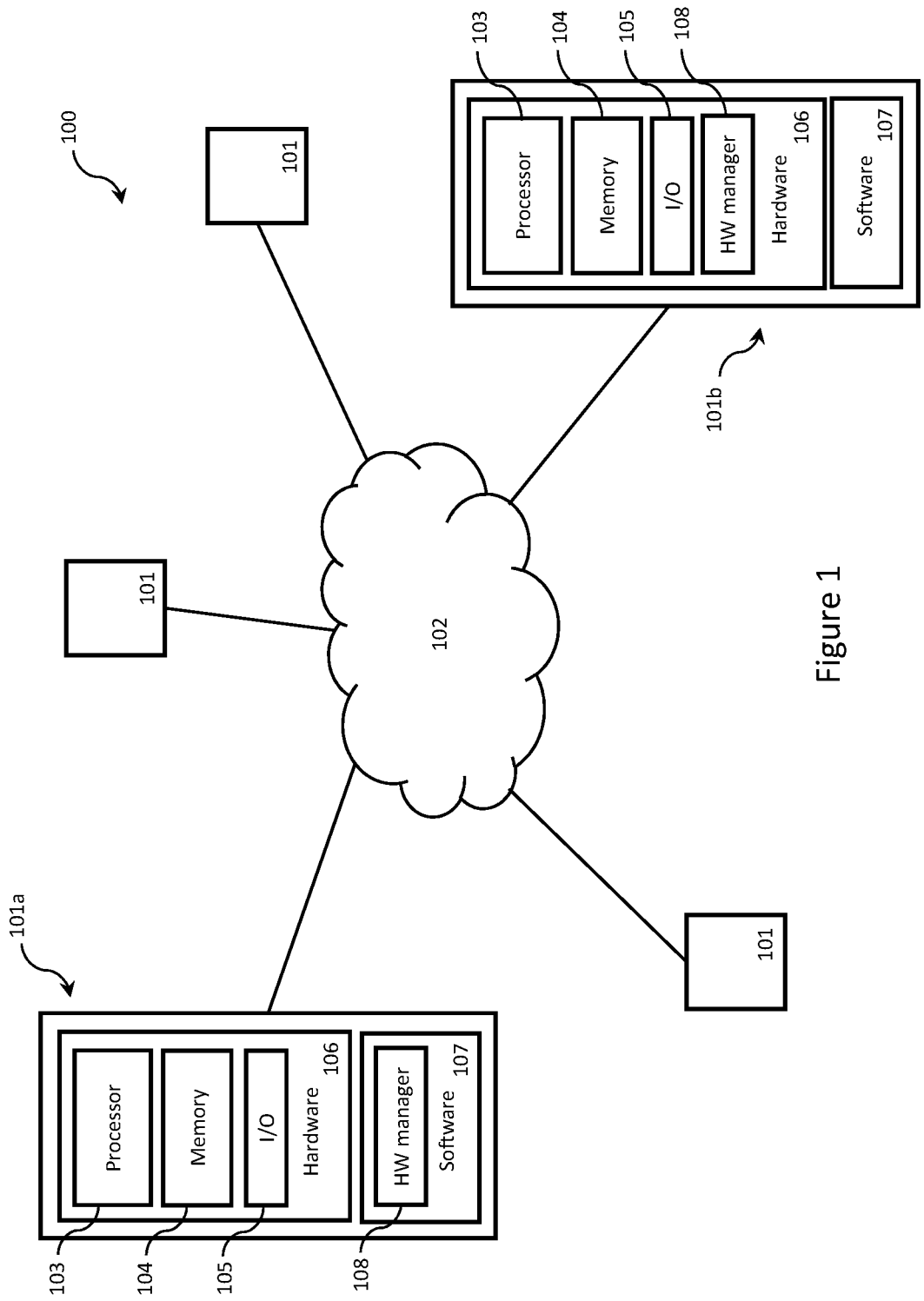
FIG. 1 is a schematic diagram depicting a computing system configured in accordance with the principles described herein.

FIG. 1 is a schematic diagram depicting a computing system 100 configured in accordance with the principles described herein. The system 100 comprises a plurality of nodes 101. Each node 101 may be any kind of computational device, such as a physical server, a virtualised cloud server instance, Internet of Things (IoT) device, or a laptop computer. One or more of the nodes may be provided at servers in a datacentre. The nodes 101 of the computing system may comprise, for example, one or more of: a server or other computer system; or a blade server of a blade enclosure; or a virtual machine which, from the perspective of the system, behaves essentially as a physical server. The nodes may be available via cloud-based platforms. The computing system may comprise any number of nodes. In some examples, the computing system may be a distributed computing system in which at least some of the nodes are separated by data links between remote endpoints of a network.

Each node 101 includes a number of hardware 106 devices, such as a processor 103, memory 104, and one or more input and output (I/O) interfaces 105. Each node 101 includes a hardware manager 108 for providing an abstraction of the hardware to a software environment 107 in which processes can execute in the manner described herein. In node 101a, the hardware manager 108 is provided in the software environment 107. For example, the hardware manager may be a local kernel. In node 101b, the hardware manager 108 is provided in hardware 106. More generally, the hardware manager of each node may be provided in any combination of hardware and software, including one or more of: in firmware; at a programmable processor; at a fixed-function processor; or, when using a virtualised instance, at a hypervisor or host operating system.

Each node 101 is a computing device which may have any kind of physical and/or logical architecture. Different nodes may have different physical and/or logical architectures. For example, some nodes may be Intel x64 machines whilst others are ARM machines. A hardware manager 108 is arranged to provide a common logical abstraction of the underlying hardware such that a process of the program may be executed at any of the nodes of the computing system 100 regardless of the underlying hardware. Different nodes may have different configurations of hardware managers as appropriate to the physical architecture at that node (e.g., nodes with different architectures may require different low-level drivers as appropriate to the instruction set of the local processor, the chipset of the I/O interface, etc.). For example, the hardware manager at a given node could be a Linux kernel appropriate to the hardware at that node, with nodes that differ in their hardware having different kernel configurations so as to provide a common software environment at each of the nodes of the system.

The nodes 101 of the computing system are able to communicate with one another over a network 102. The network 102 may comprise one or more different types of interconnect. The network may include both network data links between nodes remote to one another (e.g., nodes in different datacentres) and local data links (e.g., point-to-point links) between nodes local to one another (e.g., nodes which are located in the same datacentre). For example, some nodes may be connected by means of a data network such as the internet, a local area network (LAN) or wide area network (WAN). A local data link may be considered to be any connection between two nodes which does not traverse a data network. The particular details of the network are not important to the computing system configured in accordance with the principles described herein, and the network merely provides a communication medium over which different nodes may communicate with one another. A path between any two nodes may comprise one or more different types of interconnect.

Figure 2:
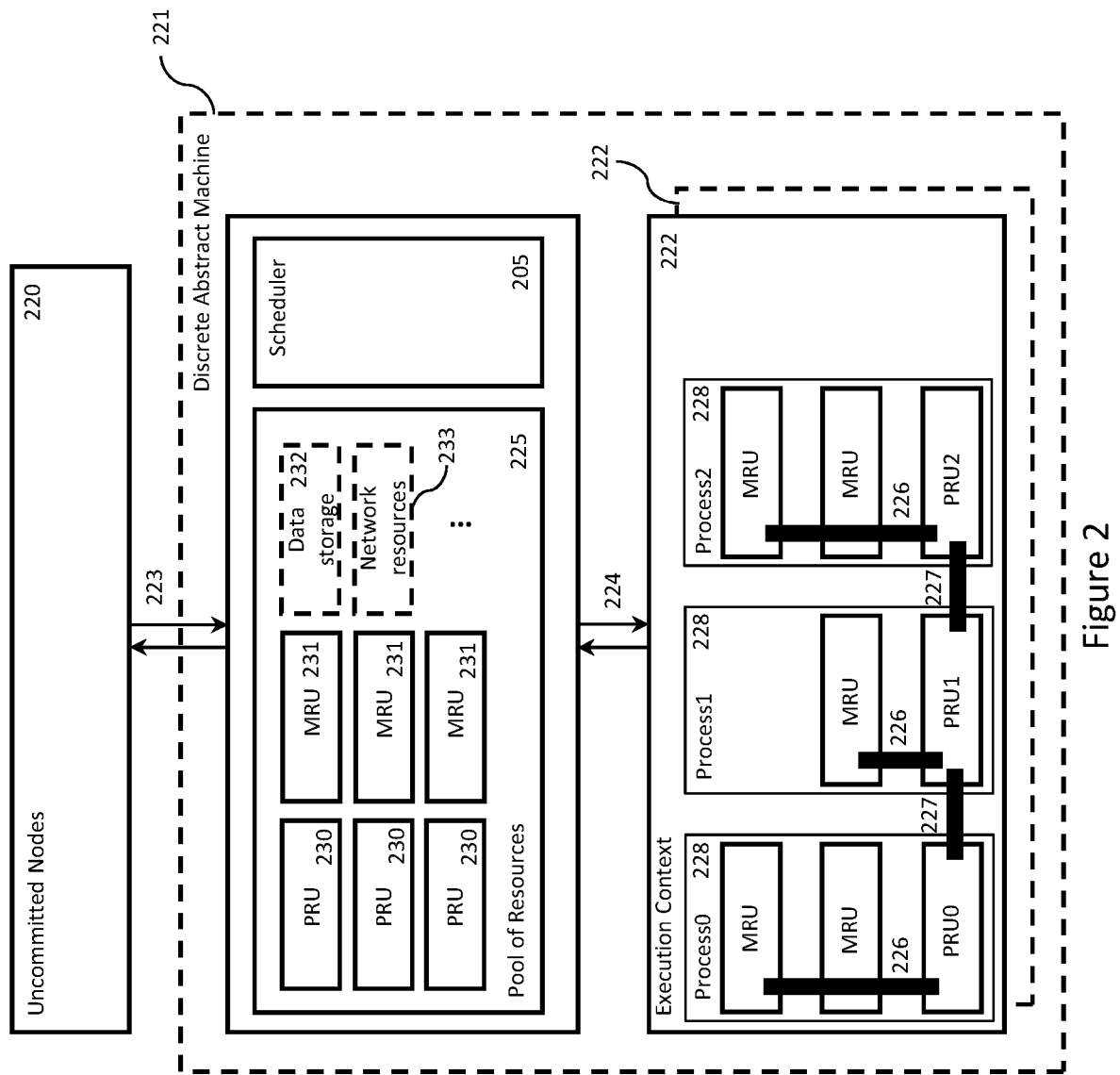
FIG. 2 is a schematic diagram depicting the logical architecture of a distributed system in accordance with the principle described herein.

FIG. 2 is a schematic diagram depicting the logical architecture of a computing system, such as the computing system 100, comprising a plurality of nodes and configured in accordance with the principles described herein. In FIG. 2, the individual nodes (e.g., compute node 101) of the computing system are not shown. FIG. 2 depicts the computing system in terms of abstract units of resource collectively provided by the nodes 101 of the system 100. Specifically, the physical nodes 101 are represented in this diagram in terms of the resources they provide to the system 100 (e.g., PRUs 230, MRUs 231, data storage 232, network resources 233). While those discrete resources are physically provided at individual compute nodes 101, as far as the logical operation of the system is concerned, the node boundaries are of low importance. The methods described herein allow programs to be designed such that the constraints of physical nodes can be largely ignored by application developers.

FIG. 2 shows a discrete abstract machine 221 (DAM) comprising a scheduler (or 'manager' or 'resource manager') 205, a pool of (computing) resources 225, and a pair of execution contexts 222. The discrete abstract machine (DAM) is a computing system operable to execute a plurality of programs. The DAM may include an execution context for each of the programs running at the DAM; in other words, each program may be considered to run in its own execution context. The nodes of the system (e.g., computing system 100) each contribute resources to the pool of resources 225, provide the execution contexts and support the scheduler 205. The DAM is therefore collectively provided by the plurality of nodes it comprises. The pool of resources 225 comprises processing resource units 230 (PRU) (or 'finite abstract machines', or simply 'processing resources') and memory resource units 231 (MRU) (or 'compute resource units', or simply 'memory resources'), which are described in more detail below. The pool of resources 225 may comprise any other resource, such as data storage 232 (or 'storage resources') and/or network resources 233 (or 'communication resources'). The computing system is configured to execute a plurality of programs, each program comprising one or more processes 228. The execution context for a given program comprises the plurality of software environments 107 provided at the nodes of the system which support PRUs of that program.

A process 228 is any executable element of a program which may be executed independently of any other executable element of the program. Each process of a program may perform the same or different tasks. Typically a program will comprise processes of a plurality of different types. For example, a weather modelling program may be written so as to comprise a first set of processes of a first type which process incoming datasets (e.g., atmospheric pressure data, satellite images of cloud cover, rainfall measurements, etc.) so as to abstract that data into a model of current weather conditions, and a second set of processes which extrapolate the model into the future so as to provide a forecast of future weather conditions. Other processes could be provided to manage the data processing performed by the first and second sets of processes.

The scheduler is arranged to allocate PRUs to processes of the computer system in the manner described herein. The pool of resources 225 may represent those resources of the nodes committed to the system which are not (yet) assigned to any process. The computing system may comprise a plurality of uncommitted nodes 220 which are nodes that are available to provide resources to the DAM, but which have not yet been incorporated into the DAM. The uncommitted nodes represent latent resources which can be incorporated into the DAM in order to expand the pool of resources 225 available to programs executing at the DAM. For example, current cloud computing platforms offer server instances in such an on-demand manner, and, when executed in a cloud environment, the scheduler 205 is able to request additional virtual servers as needed.

Each PRU 230 is a discrete logical processing resource. Processing resources may be quantified in any suitable manner, for example as a capability to perform a certain number of operations per unit time, as a number of logical or physical processing units (e.g., full or partial processors/processor cores, or their virtualised equivalents), or as any number of units of processing capability according to some defined metric. A PRU represents a discrete logical portion of the processing resources available in the pool of resources 225. The processing resources of a given PRU are local to a particular node, with each node of the computing system providing one or more PRUs. In some examples, a PRU is a logical representation of a (physical) processing core of a node.

The processing resources available to a process are discrete in that a process cannot receive an arbitrary amount of processing resources. A process may receive only a single unit of processing resource (a PRU). A process may receive a PRU as a unit of processing resource without being able to modify the amount of processing resources represented by that PRU. In some examples, different processes may specify different sizes of PRU.

A PRU may represent any kind of underlying processing resource, such as processing resources provided by one or more of a central processing unit (CPU), a graphics processing unit (GPU), a vector processor, a field-programmable gate array (FPGA), or a tensor processing unit (TPU).

The processing resources represented by a given PRU are exclusive to the process which is assigned ownership of that PRU, in that those processing resources are not available to other processes. A given node may be able to provide a number of PRUs, N, to the pool 225 with each PRU representing 1/N of the available processing resources of the node. The available processing resources of a node may be the processing resources remaining after the processing requirements of the hardware manager are accounted for.

The execution of a process at one PRU at a node may be isolated from the execution of another process at another PRU at that same node in any suitable manner as appropriate to the architecture of that node. For example, where more than one PRU may be provided at a processor or processor core, the instruction set of the processor may allow such isolation through the use of protected modes or other isolation mechanisms. The isolation of processes at a node may be managed by the hardware manager at that node according to the local architecture of that node. In some examples, processes behave collaboratively to provide their own isolation (e.g., by voluntarily following mutex or semaphore concurrency semantics), and such mechanisms are not required at a lower level (e.g., at the hardware or operating system level).

Each MRU 231 is a discrete memory resource. Memory resources are typically expressed in terms of bytes but, in general, memory resources may be expressed according to any suitable metric. An MRU is a logical portion of memory available in the pool of resources 225. The memory resources of a given MRU are local to a particular node, with each node of the computing system providing one or more MRUs. In some examples, an MRU is a logical representation of a contiguous block of (physical) memory.

An MRU represents a discrete, bounded portion of memory available to a process. The memory resources available to a process are discrete in that a process cannot receive an arbitrary amount of memory resources. A process may receive memory resources only as discrete units (the MRUs). A process may receive an MRU as a unit of memory resource without being able to modify the size of the memory resources represented by that MRU. A process may be able to receive one or more MRUs. In some examples, different processes may specify different sizes of MRU.

Each MRU is exclusive to the process to which it is allocated and is not available to any other process. In other words, the memory resources represented by the MRU are not shared with the memory resources represented by the MRU(s) of any other process. In this manner, processes may be prohibited from sharing memory with one another. The size of the MRU may be specified by a parent process upon a new child process being created (or 'spawned', or 'launched', or 'instantiated') at the system—e.g., in response to a request to execute the process. In some examples, processes may cause the execution of other processes. Each process may specify a different MRU size.

An MRU represents a bounded (or 'finite') size of memory resources available to a given process running at the DAM. Because the memory resources are bounded, processes may not be able to exceed their allocated memory resources, and therefore allocated memory resources can be guaranteed. In contrast, in an environment where processes can exceed (or grow) their existing resource allocation, the allocated resources cannot be guaranteed. Different processes may be allocated different fixed (or 'immutable') sizes of memory resources (the MRUs). In other words, a process may not be able to change the amount of memory that has been allocated to it, even if it requests more memory (it can, however, spawn new processes, as discussed in more detail below). The available memory resources of each node may be made available to the pool of resources 225 for allocation to the programs running at the DAM as MRUs of appropriate size. The available memory resources at a given node may be the total memory resources of that node after the memory requirements of the hardware manager are accounted for.

A program may comprise any arrangement of processes. For example, a program is designed such that a first, or 'root', process is initially launched. The root process may then issue execution requests so as to cause the execution of a set of different types of processes which collectively perform the various functionalities of the program (e.g., processing data from various sources so as to generate a model for weather forecasting). Such execution requests may be received by the scheduler 205 and handled in the manner described below. In some examples, a process may cause the execution of a child process by issuing suitable execution requests (e.g., a spawn request). Examples of process topologies are given below.

Other discrete resources for supporting the execution of a process may also be contributed to the pool of resources 225. Examples of such resources include data storage 232 (e.g., a guaranteed amount of exclusive data storage such as might be provided by a cloud-based storage service) and network resource 233 (e.g., a guaranteed bandwidth over a network link, such as a network link to a cloud service). Each node of the computing system may contribute one or more of said other types of resources. For example, one or more nodes may contribute network resources, while others may contribute storage resources in the form of disk. Although resources are described as being contributed by the nodes, it should be understood that those resources may be backed or supported by other resources outside the node. For example, a network resource may represent access to a network card, and that network resource may be backed or supported by bandwidth on data links of the network, such as an internet connection.

The pool of available resources 225 can be scaled in size 223 in response to changes in demand for resources. The resources of the pool may be increased by adding uncommitted nodes 220 to the system, in other words, by 'committing the nodes'. In an example, the scheduler could provision a new cloud server instance (by utilising the cloud provider's application programming interface, API) to serve as a new node and add this new node (and its resources) to the pool of resources 225.

The resources of the system are provided by the nodes of the computing system. The computing system may include a set of uncommitted nodes 220 which are not part of the DAM. The pool of resources 225 may be enlarged by adding uncommitted nodes to the DAM so that the resources of those nodes are added to the pool. When all of the resources of a node have been released, the node may be returned to the set of uncommitted nodes 220. Nodes can be removed from the set of uncommitted nodes (e.g., for maintenance or upgrades) or can be added to the set (e.g., to provide more gross resources for large tasks). In some examples, the scheduler 205 may recognise when a committed cloud instance serving as a node is unutilised, elect to remove that node (and its resources) from the pool of resources 225, and 'uncommit' that node (e.g., de-provision the cloud instance using the cloud provider's API).

The scheduler 205 is responsible for allocating resources from the pool of resources and assigning ownership of those resources to newly-created processes. The scheduler may comprise any number of components in any combination of hardware, software, and firmware. The scheduler may execute at any number of nodes of the system and may itself comprise one or more programs, each itself composed of one or more processes. A component of the scheduler may be provided at each node of the system. In some examples, the scheduler comprises a local scheduler at each hardware manager 108 and a global scheduler which executes in the context of the DAM (e.g., at one or more nodes of the system). The local scheduler at a node may respond to requests for resources from processes at that node (e.g., requests to execute a new instance of a process with further resources). If the local scheduler can satisfy such a request at that node (e.g., by allocating PRUs and MRUs provided by that node) the local scheduler may preferentially allocate discrete resources from that node; if the local scheduler cannot satisfy such a request the local scheduler may invoke the global scheduler so as to cause the global scheduler to allocate discrete resources from another node of the system.

Each program may identify one or more execution parameters to the scheduler. The execution parameters may include a resource specification. For example, a program may specify that its first process is to receive computation resources of one CPU, memory resources of 1 gigabyte (GB), or both. The execution parameters of a program may be received by the scheduler on instantiation of the program at the DAM. The execution parameters may be defined for the program at its compilation and/or at launch/interpretation of the program. The execution parameters of the program may be constrained to lie within bounds predefined for the computing system.

Each program comprises one or more processes. The instructions on which a process operates may be a proper sub-set of the instructions of the program. Each process may operate on an independent set of compute resources (e.g., PRUs and MRUs). Each process may be executed concurrently, with some processes executing at the same node and other processes executing at (a) different node(s). A program comprises a plurality of processes which, when executed, collectively execute the program as a whole.

Each process to be executed is allocated a PRU and at least one MRU from the pool of resources. Each process is allocated a PRU and MRU(s) which are local to one another, that is, at the same node. Each PRU runs only one process. Each PRU can operate on one or more (local) MRUs. The MRUs allocated to a process include at least one discrete memory resource of the size defined by the program to which the process belongs.

Channels 227 are provided between processes to enable those processes to communicate. A channel may be created from a first process to any other process in the system for which the first process has a reference. In some examples, the scheduler 205 may automatically open a channel from a parent to a child process in the event of a successful process creation (e.g., a successful spawn request). In other examples, channels are created explicitly by the processes involved.

Different processes of a program may be allocated resources from different nodes of the computing system such that a single program may execute in the context 222 at a plurality of different nodes of the computing system.

By way of example, FIG. 2 depicts a program comprising three processes 228 being executed at execution context 222: Process0, Process1, and Process2. Each of the three processes have been allocated computation resources: PRU0, PRU1, and PRU2 respectively. Process0, and Process1 are in communication via a channel 227. Process1 and Process2 are also in communication via a channel 227. Although not shown in FIG. 2, it would also be possible for Process0 and Process2 to communicate were a channel to be formed between them. Process0, Process1, and Process2 may be present on the same node of the computing system, or may be present on different nodes. Channels 227 may permit communication between processes on different nodes. For example, channels 227 may permit communication between processes via the network.

A channel 227 may be any type of logical communication link between two or more processes. A channel may be an unbuffered byte stream. It may be possible for any process to which resources have been allocated to open (or 'create', or 'form') a channel to any other active process of the system.

In the execution context 222 depicted in FIG. 2, Process0 operates on two MRUs. Process0's processing resource (PRU0) interfaces with its associated MRUs via a logical bus 226. A logical bus supports access and read/write operations on connected MRUs by their associated PRU. Further depicted in FIG. 2, Process1 and Process2 operate on one and two MRUs respectively. Each process's PRU interfaces with their respective memory resources via logical bus 226 as described above. A bus may be any logical communication link between a PRU and the MRUs associated with that PRU. A logical bus may connect PRUs and MRUs present at the same node.

The discrete memory resources represented by an MRU are bounded (or 'finite') such that the memory resources allocated to a process cannot be exceeded. For example, an MRU may be bounded such that the memory used by the process cannot grow larger than the upper bound represented by the predefined size of that MRU. For a given process, the bound(s) on each resource may be set in accordance with execution parameters for that process. The bound(s) may be defined in absolute or relative terms, e.g., depending on the type of resource. For example, bounds for memory resources may be defined in absolute terms (e.g., 3 gigabytes), while bounds for processing resources may be defined in relative terms (e.g., a percentage of a single processor core). The bound(s) set on each resource allocation may be defined by the process. For example, the bounds may be defined as execution parameters of the process.

The processing resource bound may be expressed relative to the processing resource available at the node. The available processor resource may vary over time in an absolute sense due to, for example, thermal throttling of the node. In some examples, the bound may be expressed in terms of an N % share of a single processor available to that node, where N must be greater than 0 and not greater than 100. In some examples, the bound may be expressed as a number of processor cores (e.g., a single processing core). For a given process, the bound(s) on each resource may be set in accordance with execution parameters for that process. The bound(s) may be defined in absolute or relative terms. The bound(s) set on each resource allocation may be defined by the process. For example, the bounds may be defined as execution parameters of the process.

In some examples, it can be useful to arrange that a PRU is allocated to a process for a finite period of time. The period of time may be set in the execution parameters of the process. After the finite period of time has expired, the PRU, and any MRUs associated with that PRU, may be de-allocated and returned to the pool of resources. The scheduler may be configured to perform such de-allocation of resources.

The discrete channels 227 that enable PRUs to communicate with one another may also be discrete resources. A channel may have an upper bound on the amount of bandwidth resource represented by the channel. For example, the absolute bandwidth resource between nodes may vary over time, e.g., due to traffic and network availability. In an example, the bound may be expressed in terms of a 1/N share of the bandwidth resource available.

The bounded (or 'finite') memory resources described herein may not be shared between processes. In this manner, a process is guaranteed exclusive use of its memory resources. For example, a discrete memory resource may be guaranteed in physical memory. That is, each MRU at a node may be backed by an amount of physical memory equal in size to the size of that MRU. Allocating resources in this manner advantageously leads to the predictable execution of programs by the DAM. A process being executed on the DAM can be sure of the amount and availability of the resources that have been allocated to it.

Programs may grow by creating further processes and requesting further units of discrete resources to be assigned to these new processes. Programs may not, however, grow by increasing the size of the resources allocated to its existing processes. The processes described herein therefore have 'fixed' or 'immutable' resources allocated to them. In some examples, a process may create one or more child processes—e.g., by making a spawn request. In response to this request, a child process may be instantiated and allocated discrete resources in the manner described herein by the computing system (e.g., its scheduler). In this manner a program may grow in size. As a result, a process does not control the amount of computing resources allocated to that process, but instead controls the amount of computing resources allocated to its child processes.

A child process may be a copy of the "parent" process. A child process may be arranged to perform the same operations but process different data. For example, in large scale computing, it can be advantageous to arrange that multiple agent processes each perform a predefined set of operations in parallel on a large data set. A child process need not proceed in a way that is "subordinate" to its parent process, and in some examples may proceed to direct the behavior of its "parent" process.

A child process is assigned ownership of discrete resources on its instantiation (or 'launch'), including, at minimum, computation and memory resources. The child process may be allocated a channel to communicate with its parent process. The PRU and MRU(s) allocated to the child process are isolated from the PRU and MRU(s) allocated to the parent process. That is, the child process cannot access the discrete resources of the parent process and vice versa. The discrete resources allocated to the child process may be located on the same node as the discrete resources allocated to its parent process, or a different node.

In computing systems configured in accordance with the principles described herein, a process often may not specify where the discrete resources it is allocated should be located.

In this sense the system is scale agnostic because requests for resources are made to the DAM (e.g., its scheduler) and, in response, resources may be allocated from anywhere in the system. Thus the system is configured with the expectation that each process of a program can operate independently of any other process of that program. Nonetheless, it may still be advantageous to configure the scheduler to allocate resources to the processes of a program so as to minimise the distance (e.g., communication latency, physical distance) between the discrete resources of the processes of a program. Any suitable approach for optimising the performance of a distributed system of processing entities may be used. As a simple example, the initial attempt is to allocate resources at the requesting node (that is, the node on which the requesting process executes/the node providing the PRU allocated to the requesting process), and then 'fall back' to a different node if insufficient resources are available at the requesting node.

Figure 3:
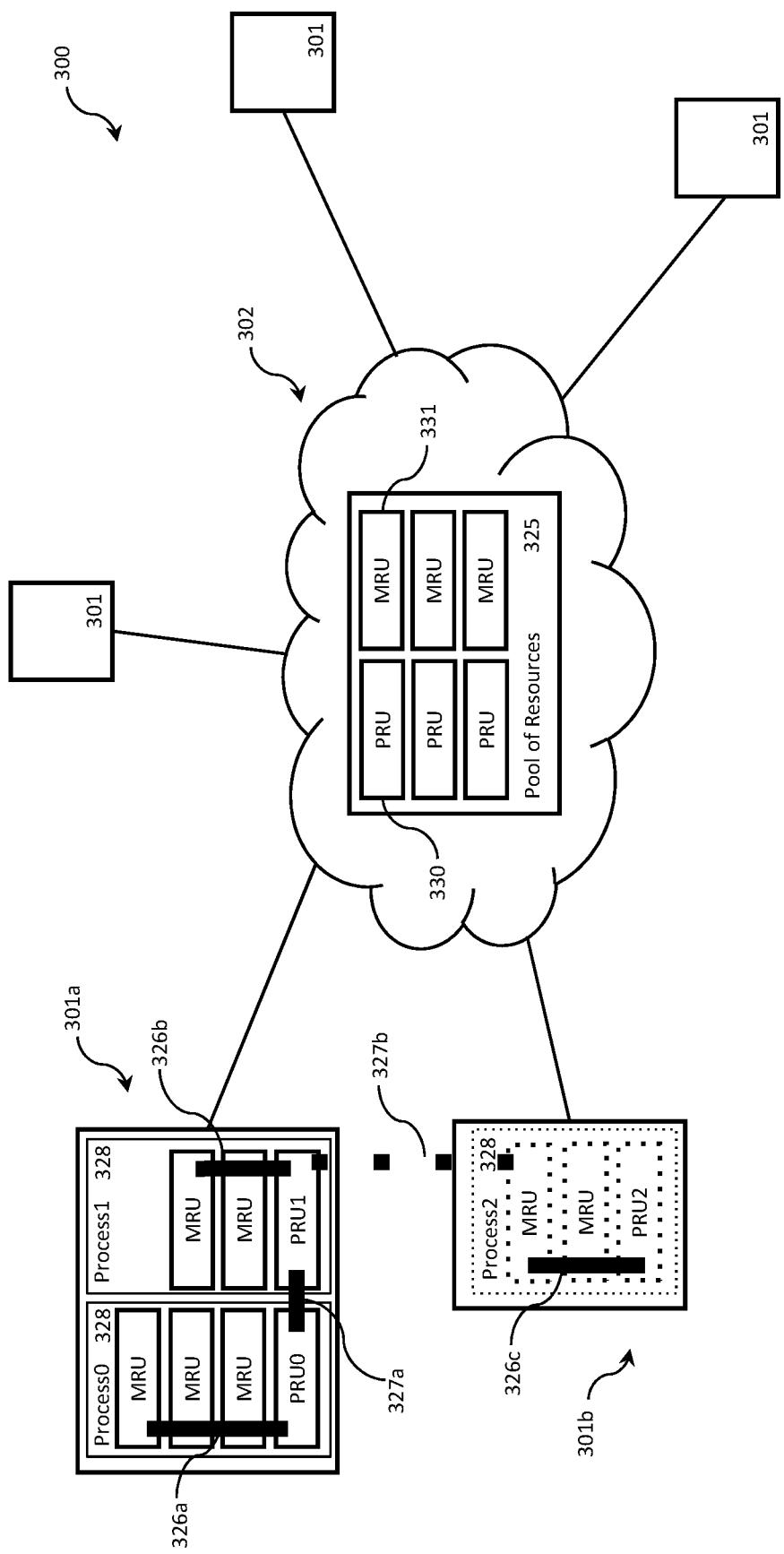
FIG. 3 is a schematic diagram depicting a distributed system executing a program in accordance with the principles described herein.

FIG. 3 is a schematic diagram depicting an exemplary computing system 300 (which may be an example of computing system 100) executing a program in accordance with the principles described herein. The nodes of the computing system 300 contribute resources to a pool of resources 325. The pool of resources 325 comprises PRUs 330 and MRUs 331. Nodes 301 may be uncommitted nodes. The resources in the pool of resources 325 are interconnected by network 302.

Consider an example in which a program comprises two processes 328, called Process0 and Process1, running at PRU0 and PRU1, respectively. In this example, PRU0 and PRU1 are both present on node 301a. Process0 and Process1 can communicate via channel 327a. Three gigabytes of memory are allocated to Process0, and two gigabytes of memory are allocated to Process1. The two processes begin execution concurrently.

The process running at PRU1 may issue a request to a scheduler (e.g., scheduler 205 of FIG. 2) to spawn a child process that requires two MRUs. The request is received by a local scheduler (not shown) at node 301a. In this case, two MRUs are not available at the node 301a, and the local scheduler therefore passes the request up to a global scheduler (not shown), which may be distributed in any suitable manner over the network. In response, the global scheduler causes a child process to be instantiated at a second node 301b. The child process, called Process2, is allocated at PRU2 on node 301b. Process1 and Process2 communicate via the network using channel 327b. In accordance with the request, two MRUs are allocated to Process2.

Figure 4:
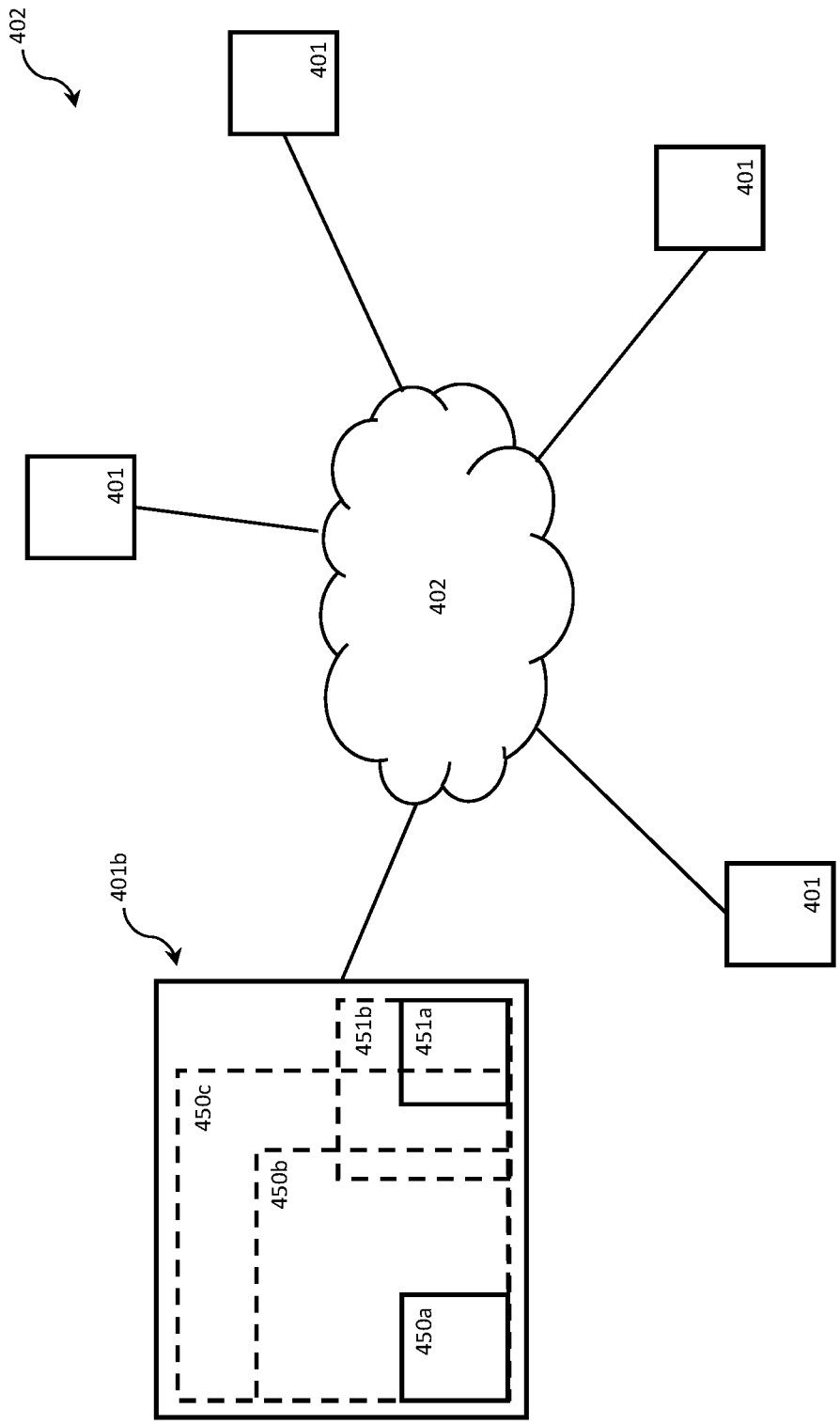
FIG. 4 is a schematic diagram depicting a distributed system executing a program in a conventional manner.

FIG. 4 is a schematic diagram depicting a distributed system executing a program in a conventional manner. In particular, FIG. 4 schematically depicts the availability of memory on node 401b.

Programs 450a and 451a are consuming memory on node 401b. Node 401b may support memory sharing, such that any unallocated memory available on the node can be accessed on demand by either of programs 450a or 451a.

In an example, program 450a exhausts its existing memory allocation and demands additional memory. For example, program 450a may use a memory allocation function, such as malloc( ). Program 450a is allocated additional memory resources, for example by the local or host kernel, and grows to 450b. As the additional memory resources are available in this instance, both programs 450b and 451a can continue to co-exist on node 401b. Conventional systems often rely on this scenario.

However, in an example, program 451a may be temporarily idle and/or may have dynamically shrunk. If program 451a were to attempt to re-grow to its previous size 451b by demanding additional memory, it may discover that memory that was previously available is no longer accessible as it is now being accessed by program 450b. In this example, program 451a may crash because it is unable to access the memory it requires. In this way, the growth of program 450a to 450b has indirectly caused program 451a to crash. This allows the system to provide a robust execution environment for programs without the overhead and potential failure modes associated with virtual memory management.

In another example, program 450b may again exhaust its memory allocation and demand additional memory. For example, program 450b may demand the amount of memory represented by 450c. Programs 450c and 451a cannot both access the same memory in the same instance. In order to free up memory for consumption by program 450b the local or host kernel may begin to randomly terminate processes on node 401b. This could lead to either program 450b or 451a being terminated.

In contrast, in the example shown in FIG. 3, a process having been allocated an insufficient amount of resources may fail (for example, because the program input to the system was badly written by the user). However, because the process cannot simply allocate itself an indefinite amount of additional resource, it cannot cause the local or host kernel to begin randomly terminating other programs—which would typically lead to system crashes. This leads to greater predictability for programs executed with this method.

Figure 5:
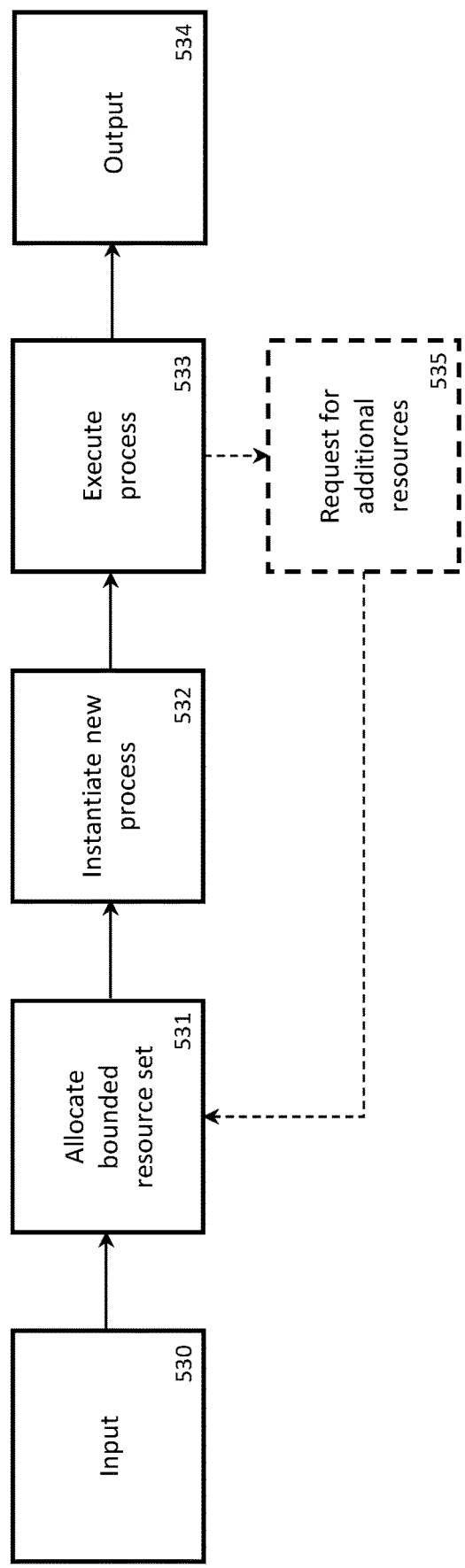
FIG. 5 is a flow-diagram showing a method of executing a program using a discrete abstract machine.

FIG. 5 is a flow-diagram showing a method for executing a program using a discrete abstract machine configured in accordance with the principles described herein. The program comprises a plurality of processes. The program to be executed, along with the resource requirements for the first (or 'root') process of the program, is input 530 to the system. Discrete resources are allocated 531 for the root process in the manner described herein. The process is instantiated (or 'initialised') 532 in accordance with the requirements of the software environment provided by the DAM and the relevant resources (allocated in 531) are exclusively assigned to the process. So as to perform the program, the process executes 533, and the result of the computation performed by the process is output 534. Optionally, the process being executed may request 535 additional resources 531 for the program, causing one or more corresponding child processes to be instantiated 532. Any of the child processes may in turn request 535 additional resources 531, causing one or more additional child processes to be instantiated 532, and so on.

Figure 6:
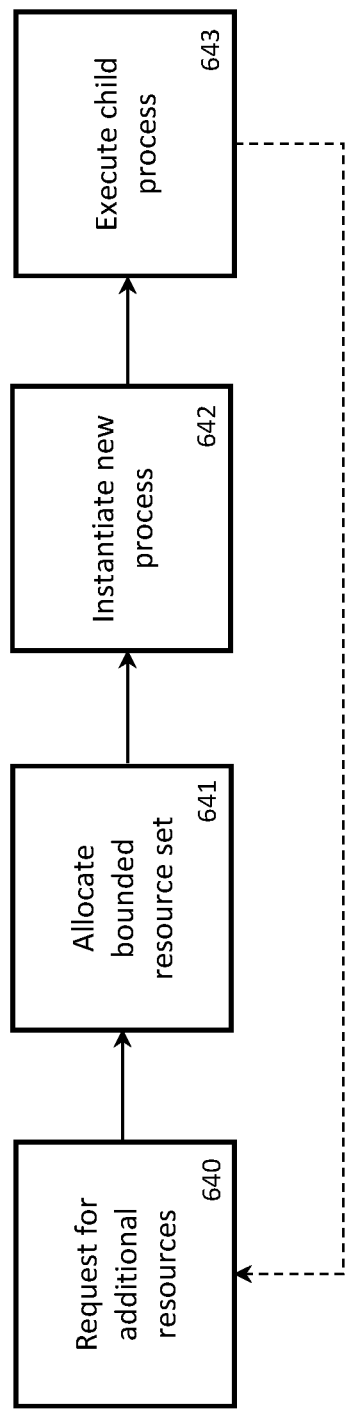
FIG. 6 is a flow diagram showing a method of allocating additional resources to a program being executed by a discrete abstract machine.

FIG. 6 is a flow diagram showing a method for allocating additional resources to a program being executed by a discrete abstract machine. A first process which has previously been allocated bounded finite resources and is being executed by the DAM submits a request 640 for additional resources. Discrete resources are allocated 641. A child process is instantiated (or 'initialised') 642 and assigned the resources allocated in 641. The child process may be a copy/clone of the first process. The child process is executed 643. Optionally, the child process itself may request 640 additional resources—and the process is repeated. In other words, programs being executed by the DAM may grow by existing processes causing new processes to be instantiated which receive further resources. In this manner, the computational space of the program may be increased. Processes do not grow by increasing the size of their existing allocated resources.

Figure 7:
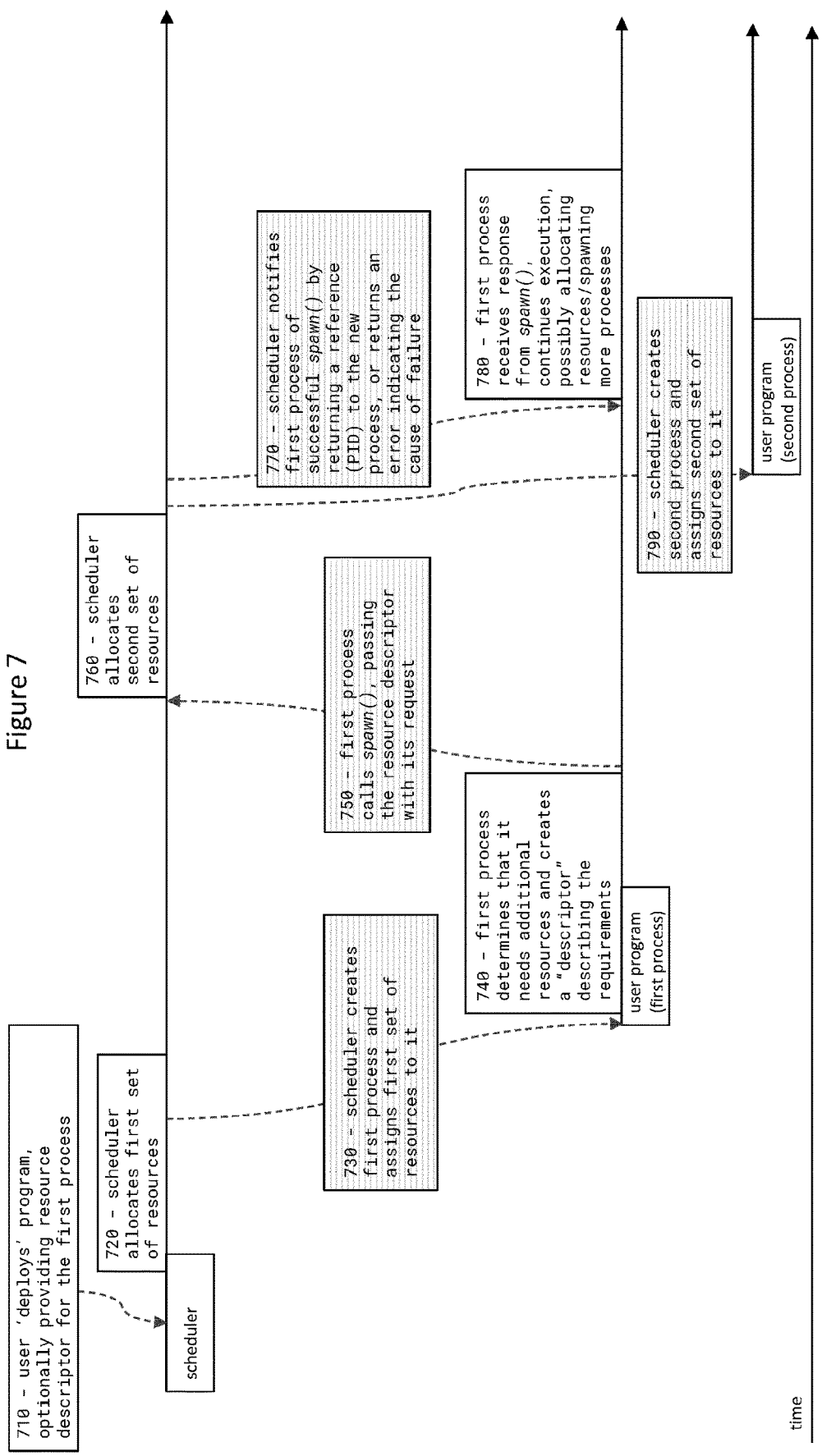
FIG. 7 is a flow diagram showing a method of allocating additional resources to a program being executed by a discrete abstract machine.

FIG. 7 is a flow diagram showing a method for obtaining and/or allocating computing resources. In this figure, text boxes with hatching represent communications between processes, while text boxes without hatching represent steps performed by a particular process. The method shown in FIG. 7 may represent an example of the methods of FIGS. 5 and 6.

In step 710, a user requests that a computer program be launched (or 'started', or 'deployed'). In some examples, the user's request is an initial spawn request to the scheduler.

In some examples, the request includes a resource requirement descriptor (or 'resource specification') specifying the resources required by a first (or 'root') process of the computer program; in other examples, the resource requirement descriptor is specified (or 'encoded') in the computer program. In some examples, a resource requirement descriptor included in the user's request may fully or partially override the resource requirement descriptor specified in the computer program.

The resource requirement descriptor comprises a set of resource types and corresponding values, indicating how much of each kind of resource is required. Depending on the type of resource, the values may be specified in absolute terms, or in percentage terms, and may or may not specify a unit.

In some examples, the descriptor may be in JavaScript Object Notation (JSON) format. For example, the descriptor may be of the form {"cpu": 0.60, "mem": 1000, "disk": "12GB", "net": "60/20"}, indicating that the process requires: 0.6 central processing units (60% of a single core), 1,000 megabytes of memory, 12 gigabytes of disk space, and a minimum network bandwidth of 60 kilobits per second download/20 kilobits per second upload.

In step 720, a first bounded amount of computing resources, forming a first set of computing resources, is allocated (or 'earmarked') by the scheduler. In some examples, the scheduler allocates computing resources from the pool of resources described above. In some examples, as described above, the scheduler may instantiate new cloud servers to satisfy the user request. In some examples, the first bounded amount of computing resources to allocate is determined based on the resource requirement descriptor in the request of step 710, or specified in the computer program.

It should be understood that, in the present disclosure, an 'amount' of computing resources may not denote a single quantity, and may thus comprise a quantity for each type of computing resource, as can be seen from the above exemplary descriptor. Though the methods described herein can support allocation of any arbitrary resource types, the focus is on fundamental resources required for process execution: processing (CPU) and memory resources. Important, but secondary, resource types include disk space and network bandwidth. Additional resource types may include: GPU, TPU, or FPGA resources; domain- or application-specific input/output devices (e.g., specific sensors or actuators); or the like.

In general, the scheduler 205 may rely on the hardware manager 108 to perform any low-level operations necessary to give a process access to allocated resource(s). Any software running on a node will need to use such a hardware manager to achieve access to underlying physical resources (that is, its local CPUs, memory, disk, network, etc.), and a scheduler is no exception. As described previously, such a hardware manager may be implemented in hardware or software.

In step 730, the first set of computing resources is exclusively assigned to the first process of the computer program by a scheduler (e.g., the scheduler 205 described above). The first set of computing resources may be backed by physical resources of the first bounded amount to guarantee the first bounded amount of computing resources to the first process. In some examples, the first bounded amount represents an upper limit on the computing resources available to the first process.

In an example, the scheduler 205 may assign resources by performing bookkeeping to record which physical resources that are under its control (that is, the local CPU(s), memory, disk, network, etc.) have been assigned (via a hardware manager, discussed above) to which processes, and updating these records whenever said resources are assigned or relinquished. The scheduler thereby ensures that it does not assign the same physical resources to more than one process. In other words, all physical resources are mapped to exactly one resource unit (or 'abstract container', e.g., PRU, MRU) and each resource unit is assigned to exactly one process.

In step 740, the first process determines that it needs additional computing resources. In some examples, the first process additionally or alternatively determines an amount of computing resources to request. In some examples, the first process forms another descriptor describing the (additional) computing resources that it requires.

In step 750, the first process transmits a request for additional computing resources to the scheduler. In some examples, the request comprises a spawn request. In some examples, the request (or spawn request) comprises the amount of computing resources to be assigned to a second (child) process, or comprises the descriptor describing the required computing resources. In some examples, the request specifies that the computing resources that are allocated should be provided by the same node that provides the processing resources used to execute the first process; in other words, that the computing resources be local.

In some examples, in addition to the amount of computing resources or the descriptor describing the required computing resources, the request from the first process may comprise other, additional constraints on these new resources. For example, a program may require that the resources for the second process be provided by a node whose network latency to the node providing the resources for the first process is less than some arbitrary duration. Additionally, such constraints on the resources may be 'strict' (the scheduler must satisfy these additional constraints or fail the allocation) or may be 'relaxed' (the scheduler should try to satisfy these additional constraints if possible, but is free to return any available resources if the constraints cannot be fulfilled). In the case of allocation failure, the process that requested the failed spawn decides how to proceed (e.g., retrying the spawn with different constraints, relaying the failure to a controller process).

In step 760, in response to the request of step 750, the scheduler allocates a second bounded amount of computing resources forming a second set of computing resources in the same manner as step 720. In some examples, the second bounded amount of computing resources is based on the amount specified in the request of step 750, e.g., on the descriptor comprised therein. In some examples, the second bounded amount is the same as the first bounded amount, but this need not be the case.

In other examples, if the request of step 750 does not specify the amount of computing resources, the scheduler allocates a predetermined amount of computing resources in response to that request.

In step 770, the scheduler spawns (or 'creates') a new, second process from the first process. In order to create a new process according to the method described herein, the scheduler should have first allocated resources for the new process (described above in step 760) at some node, N. The scheduler will communicate with the hardware manager on node N, instructing it to create an execution context (whose details/contents may differ depending on the underlying hardware architecture of node N) to contain the new process. This execution context can then be assigned ownership (again, via the hardware manager) of the earmarked resources, the program's binary code can be transferred to node N (assuming that a copy does not already exist locally), and the process itself can be started and begin execution from the specified entry point.

In step 780, the first process receives a response to the request of step 750. In some examples, the response comprises a notification of the successful spawn, or an error indicating a cause of failure. In some examples, the response comprises a reference to the new process, such as a process identifier (PID).

In step 790, the scheduler exclusively assigns the second set of computing resources to the second process. The second set of computing resources may be isolated from the first process, as explained above. The second set of computing resources may be backed by physical resources of the second bounded amount to guarantee the second bounded amount of computing resources to the second process. The first and second set of computing resources may be provided by a single node, or by two nodes. In the case that the resources are provided by two nodes, these nodes may be 'local' or 'collocated' (e.g., on the same LAN or in the same datacenter), or remote from each other (e.g., connected by WAN).

In some examples, the scheduler allocates one or more 'channels' for communication between processes, such as the first and second processes, as described in detail above. Depending on the location of the nodes that provide the relevant computing resources (e.g., the location of the nodes that provide the first and second set of computing resources) the one or more channels may comprise an inter-process communication (IPC) channel, such as channel 327a of FIG. 3, and/or a network channel, such as channel 327b of FIG. 3.

Any active process in the system can open a channel to any other active process in the system using a 'process identifier' (or PID) as a reference. In some examples, the scheduler is able to do this by maintaining a mapping of PIDs to the nodes on which those processes run. In this way, when a user process requests to open a channel to a process with PID P, the scheduler can look up on which node process P runs, and subsequently open a communication channel using the known details of the node (e.g., Internet Protocol (IP) address, port number). Alternatively, the scheduler could construct its process references (i.e., PIDs) in such a way that the important network details required to open a channel are encoded in the PID itself. As an example, a PID could be a 48-bit identifier, composed of 32 bits of IPv4 network address and 16 bits of IPv4 port number. In any case, a PID can be shared with other processes via any established communications channel. As an example, a process, A, might spawn two children, processes B and C. Process A may then open channels to both of its children and send each of them a reference to their respective sibling. Either process B or C could then subsequently open a direct communications channel to the other, via the reference received from A, its parent.

A process obtaining resources as explained herein may be unaware of the underlying transport details of the channels it shares with other processes. That is, if there is a channel between process A and process B, those two processes need not know whether the channel is implemented over local IPC, local-area network links, wide-area network links, or some other transport mechanism.

In some examples, the scheduler creates (or 'instantiates') the second process. The second process then executes. In some examples, the second process will be little more than a 'worker task' for the first process. In such a role, the second process may perform some short-lived tasks on behalf of the first process, before terminating and (likely) signalling success or failure status to the first process via a channel. In other examples, the second process operates independently of the first process, for example managing some long-running task. In such a role, the second process may need to execute a number of sub-tasks, requiring it to spawn several children of its own. Processes performing such long-running services typically do not need to communicate an explicit success/failure status to the original parent process, and may indeed outlive the parent process.

In some examples, the second process can in turn performs steps 740 and 750 any number of times, resulting in at least a third set of computing resources being allocated, a third process being spawned, and the third set of computing resources being exclusively assigned to the third process. In this way, the second process is able to solve computational problems that exceed the bounded set of resources assigned to that process without needing to increase its own resource allocation. The third process may communicate not only with the second process, but with any other process of the computer program (e.g., the first process), thus enabling the creation of arbitrary process communication topologies.

Similarly, in some examples, after step 780, the first process can once again performs steps 740 and 750 any number of times, resulting in at least a fourth set of computing resources being allocated, a fourth process being spawned, and the fourth set of computing resources being exclusively assigned to the fourth process. The fourth process may communicate not only with the first process, but with any other process of the computer program (e.g., the second process).

In an example, the methods described herein could be used to construct a 'tree' process topology where each process in the tree may have up to 2 children (called left and right): A first process, called $P_0$, begins by spawning a 'base' for the tree, called $P_1$. The first process $P_0$ then spawns pair of processes, called $P_2$ and $P_3$, to act as the children of $P_1$. The first process $P_0$ sends the process references $(P_2, P_3)$ to $P_1$, which then opens communication channels to its left child $(P_2)$ and its right child $(P_3)$ using the received process references. $P_1$ can then spawn two further children (called $P_4$ and $P_5$), and send their references to its left child (i.e., $P_2$), whereupon the left child $(P_2)$ treats these processes as its own left and right children (that is, by opening a communication channel to each). $P_1$ can then repeat this same process, passing the two newest processes (e.g., $P_6$ and $P_7$) to be the children of its right child (i.e., $P_3$). In this way, we have constructed a tree of three levels: the base $(P_1)$, its direct children ($P_2$ and $P_3$), and its grandchildren ($P_4$ and $P_5$, left and right child of $P_2$; and $P_6$ and $P_7$, left and right child of $P_3$). The tree can continue growing in this manner, with $P_1$ adding more levels at the bottom when necessary.

In a further example, the methods described herein could be used to construct a 'ring' process topology where each process has a left and a right neighbor, such that the set of nodes forms a ring. Specifically, a first process, called $P_M$, begins by spawning a number of processes, $P_0, P_1, \ldots, P_{N-1}$. $P_M$ saves the process references received upon their creation, and sends the full list to each of its children, along with that child's index (e.g., $P_4$ would receive $\{4, P_0 \ldots P_{N-1}\}$). Each process, $P_i$, can then determine the indices of its left (i.e., (i−1)% N) and right (i.e., (i+1)% N) neighbors, wait for its left neighbor ($P_{(i-1)\% N}$) to connect via a channel, then open a connection to its own right neighbor ($P_{(i+1)\% N}$), where % denotes a modulo operation. The exception is $P_0$, which starts the connection ring by first connecting to its right neighbor ($P_1$) and then waiting for a connection from its left neighbor ($P_{N-1}$). In this way, and number of processes can be formed into a communicating ring topology.

It will be understood that any of the steps of FIGS. 5 to 7 may be omitted, combined, performed in a different order than outlined above, and/or performed concurrently. Furthermore, it will be understood that the features described above in relation to FIG. 7 may be combined with other features described herein, including, in particular, the features described in relation to FIGS. 1 to 6. The features of the examples set out herein may all be combined unless indicated otherwise.

The system described herein may be used to tackle large and/or highly complex computational problems—such as big data problems.

Turing-completeness is often perceived as a requirement for tackling large computational problems—such as big data problems. A fundamental requirement of Turing completeness is the fiction that any process can expand into an arbitrary amount of memory. This is because in order to process an arbitrarily large program, it is assumed that access to an arbitrarily large memory resource is required. In conventional systems the fiction of arbitrary memory is achieved by dynamically allocating memory to programs as they grow and allowing programs to share memory. Thus, there is a reluctance in conventional systems to enforce memory limits or prevent the sharing of memory.

In contrast, the present inventors have realised that to achieve the fiction of arbitrary memory, each individual node of a computing system does not need to be Turing complete. Instead, the resources contributed by each node can be treated as abstract units of resource. Processor Resource Units (PRUs) are discrete processing resources that act on discrete memory resources (MRUs). As such, each individual node or process cannot be considered to be Turing complete because of the bounded nature of its resources. However, on the basis that the discrete abstract machine (DAM) is capable of pooling an arbitrary number of discrete resources from a large number of nodes, the DAM as a whole can be considered to be Turing complete. In other words, each individual process in the system described herein is not a complete Turing machine. However, any instance of the system described herein behaves as a Turing machine (and hence this system is Turing complete) because that instance can grow to an arbitrary size.

The distributed systems of FIGS. 1 to 3 are shown as comprising a number of functional blocks. This is schematic only and is not intended to define a strict division between different logic elements of such entities. Each functional block may be provided in any suitable manner.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors. The methods described herein may also be implemented using dedicated circuitry/hardware, rather than a programmable device.

There is provided a computer program comprising instructions which, when executed by one or more computers, cause the one or more computers to perform any of the methods described herein. There is provided a computer-readable medium comprising the computer program, and the medium may be non-transitory. There is also provided a data carrier signal carrying the computer program.

There is provided a computer system configured to perform any of the methods described herein. The computer system may comprise one or more computers. In some examples, the computer system comprises the computer-readable medium as described above, and one or more processors configured to execute the computer program stored thereon. In other examples, the computer system comprises circuitry configured to perform any of the methods described herein.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A method of computing resource allocation comprising:
   allocating a first bounded amount of computing resources forming a first set of computing resources;
   exclusively assigning the first set of computing resources to a first process of a computer program;

receiving a request from the first process for additional computing resources;

in response to the request from the first process, allocating a second bounded amount of computing resources forming a second set of computing resources;

spawning a second process from the first process and exclusively assigning the second set of computing resources to the second process;

receiving a request from the second process for additional computing resources;

in response to the request from the second process, allocating a third bounded amount of computing resources forming a third set of computing resources; and spawning a third process from the second process and exclusively assigning the third set of computing resources to the third process.

2. The method of claim 1, wherein:
the first and second set of computing resources are respectively provided by a first and a second node of a computing system.

3. The method of claim 1, wherein the first and second bounded amounts of computing resources are different.

4. The method of claim 1, wherein allocating the second bounded amount of computing resources comprises initiating provisioning of a node to provide the second set of computing resources.

5. The method of claim 1, further comprising providing the first process with a reference to the second process.

6. The method of claim 1, further comprising:
allocating a channel for communication between the first and second processes.

7. The method of claim 6, wherein:
the channel is an inter-process communication, IPC, channel; or
the channel is a network channel.

8. The method of claim 1, wherein the computing resources comprise memory resources, processing resources, communication resources, and/or storage resources.

9. The method of claim 1, wherein the first process terminates earlier than the second process.

10. The method of claim 1, further comprising:
receiving a second request from the first process for additional computing resources;
in response to the second request from the first process, allocating a fourth bounded amount of computing resources forming a fourth set of computing resources;
spawning a fourth process from the first process and exclusively assigning the fourth set of computing resources to the fourth process; and
allocating a channel for communication between the second and fourth processes.

11. A method of obtaining computing resources comprising:
determining, by a first process of a computer program, a first amount of computing resources to request;
responsive to the determining by the first process, requesting to spawn a second process from the first process, the request comprising the determined first amount of computing resources to be assigned to the second process;
determining, by the second process, a second amount of computing resources to request; and
responsive to the determining by the second process, requesting to spawn a third process from the second process, the request comprising the determined second amount of computing resources to be assigned to the third process.

12. The method of claim 11, further comprising:
receiving, by the first process, a reference to the second process.

13. The method of claim 12, further comprising:
communicating with the second process, by the first process, via a channel from the first to the second process created using the reference to the second process.

14. The method of claim 11, further comprising:
determining, by the first process, a third amount of computing resources to request;
responsive to the determining, of the third amount of computing resources, requesting to spawn a fourth process from the first process, the request comprising the determined third amount of computing resources to be assigned to the fourth process;
communicating with the fourth process, by the second process, via a channel from the second process to the fourth process.

15. The method of claim 14, wherein the first and third amounts of computing resources are different.

16. The method of claim 11, wherein the computing resources assigned to the second and third processes are respectively provided by a first and a second node of a computing system.

17. The method of claim 11, wherein the first process terminates earlier than the second process.

18. A non-transitory computer-readable medium comprising instructions which, when executed by one or more computers, cause the one or more computers to:
allocate a first bounded amount of computing resources forming a first set of computing resources;
exclusively assign the first set of computing resources to a first process of a computer program;
receive a request from the first process for additional computing resources;
in response to the request from the first process, allocate a second bounded amount of computing resources forming a second set of computing resources;
spawn a second process from the first process and exclusively assign the second set of computing resources to the second process;
receive a request from the second process for additional computing resources;
in response to the request from the second process, allocate a third bounded amount of computing resources forming a third set of computing resources; and
spawn a third process from the second process and exclusively assign the third set of computing resources to the third process.

19. A non-transitory computer-readable medium comprising instructions which, when executed by one or more computers, cause the one or more computers to:
determine, by a first process of a computer program, a first amount of computing resources to request;
responsive to the determining by the first process, request to spawn a second process from the first process, the request comprising the determined first amount of computing resources to be assigned to the second process;
determine, by the second process, a second amount of computing resources to request; and responsive to the determining by the second process, request to spawn a third process from the second process, the request comprising the determined second amount of computing resources to be assigned to the third process.

* * * * *